US010685205B2

(12) United States Patent
Lee et al.

(10) Patent No.: US 10,685,205 B2
(45) Date of Patent: Jun. 16, 2020

(54) ELECTRONIC DEVICE WITH OPTICAL SENSOR

(71) Applicant: Samsung Electronics Co., Ltd., Suwon-si, Gyeonggi-do (KR)

(72) Inventors: Jin-Eui Lee, Seongnam-si (KR); Young-Min Seo, Seongnam-si (KR); Young-Soo Lee, Hwaseong-si (KR); Yong-Cheol Park, Seoul (KR); Bong-Jae Rhee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 89 days.

(21) Appl. No.: 16/038,753

(22) Filed: Jul. 18, 2018

(65) Prior Publication Data

US 2019/0102595 A1   Apr. 4, 2019

(30) Foreign Application Priority Data

Sep. 29, 2017   (KR) .......................... 10-2017-0127352

(51) Int. Cl.
*G06K 9/00* (2006.01)
*G02F 1/1333* (2006.01)
*G06F 3/041* (2006.01)

(52) U.S. Cl.
CPC ....... *G06K 9/0004* (2013.01); *G02F 1/13338* (2013.01); *G06F 3/0412* (2013.01); *G06K 9/0012* (2013.01)

(58) Field of Classification Search
CPC .. G06K 9/0004; G06K 9/0012; G06F 3/0412; G02F 1/13338
See application file for complete search history.

(56) References Cited

U.S. PATENT DOCUMENTS

| 9,460,332 | B1 | 10/2016 | Bussat |
| 2008/0007507 | A1 | 1/2008 | Kim et al. |
| 2009/0116030 | A1 | 5/2009 | Bahuguna |
| 2010/0008552 | A1 | 1/2010 | Shin et al. |
| 2011/0315855 | A1 | 12/2011 | Perlman et al. |
| 2016/0132712 | A1* | 5/2016 | Yang .................... G06K 9/0002 348/77 |
| 2016/0220013 | A1 | 8/2016 | Barnes et al. |
| 2016/0224816 | A1* | 8/2016 | Smith .................... G02B 27/58 |
| 2016/0254312 | A1* | 9/2016 | Lee ....................... G06K 9/0004 382/125 |
| 2017/0011251 | A1 | 1/2017 | Wu |

(Continued)

OTHER PUBLICATIONS

International Search Report dated Oct. 23, 2018, issued in the International application No. PCT/KR2018/008167.

*Primary Examiner* — John B Strege
(74) *Attorney, Agent, or Firm* — Jefferson IP Law, LLP

(57) ABSTRACT

An electronic device is provided. The electronic device includes an optical sensor, the optical sensor comprising a lighting device configured to emit light, a sensor layer including an array of sensors configured to detect first image information corresponding to an object from light reflected by the object, and a filter layer including openings configured to transmit the light reflected by the object, the filter layer disposed on the sensor layer, wherein the first image information is different from an image of the object identified with naked eyes. The electronic device may be diversified according to embodiments.

21 Claims, 14 Drawing Sheets

(56) References Cited

U.S. PATENT DOCUMENTS

| | | | |
|---|---|---|---|
| 2017/0017824 A1 | 1/2017 | Smith et al. | |
| 2017/0091506 A1* | 3/2017 | Sinha | G06F 1/1643 |
| 2017/0220844 A1 | 8/2017 | Jones et al. | |
| 2017/0316248 A1* | 11/2017 | He | G06K 9/00006 |
| 2018/0005005 A1* | 1/2018 | He | G06F 3/0412 |
| 2018/0239941 A1* | 8/2018 | MacKey | G06K 9/0004 |

* cited by examiner

ELECTRONIC DEVICE WITH OPTICAL SENSOR

CROSS-REFERENCE TO RELATED APPLICATION(S)

This application is based on and claims priority under 35 U.S.C. § 119(a) of a Korean patent application number 10-2017-0127352, filed on Sep. 29, 2017, in the Korean Intellectual Property Office, the disclosure of which is incorporated by reference herein in its entirety.

BACKGROUND

1. Field

The disclosure relates to electronic devices. More particularly, the disclosure relates to sensors for detecting object images or biometric information about users via an optical structure and electronic devices including the sensors.

2. Description of Related Art

Generally, the electronic device means a device performing a particular function according to the electronic device's installed program, such as a home appliance, an electronic scheduler, a portable multimedia player, a mobile communication terminal, a tablet PC, a video/sound device, a desktop PC or laptop computer, a navigation for automobile, etc. For example, electronic devices may output stored information as voices or images. As the electronic devices are highly integrated and high-speed, high-volume wireless communication becomes commonplace, mobile communication terminals have recently being equipped with various functions. For example, the electronic device comes with the integrated functionality, including an entertainment function, such as playing video games, a multimedia function, such as replaying music/videos, a communication and security function for mobile banking, and a scheduling or e-wallet function.

A recent common trend for the electronic devices is to equip them with cameras for photographing or various optical sensors, e.g., illuminance sensors, to detect the operational environment. Mobile communication terminals or other portable electronic devices are also equipped with functionality for protecting personal information stored therein or security functions necessary to run various applications for mobile banking, mobile credit cards, or electronic wallets. The security functionality that electronic devices provide may be achieved by, e.g., setting a password or lock pattern or by authenticating the user via a security service provider. However, these ways have their own disadvantages—e.g., password setting is a less secure way due to the likelihood of password leakage, and using a third party security company for security purposes is burdensome. An alternative is biometric authentication. Biometric authentication may attain a higher level of security as well as better user convenience, e.g., by fingerprint or iris scanning.

Fingerprint scanning for user authentication comes in an optical type and an ultrasonic wave type. According to this, light or ultrasonic waves are radiated to the user's fingerprint, and their reflection from the fingerprint are used to obtain the user's fingerprint image. Another type of fingerprint scanning that may be proposed, is to use a fingerprint scanning sensor that has an array of electrodes and detects the user's fingerprint in a capacitive manner. In such capacitive-type fingerprint sensor, the electrodes may produce a capacitance corresponding to at least a portion of the object, e.g., ridges or valleys of the user's fingerprint.

An optical structure to detect an image of the object, e.g., the user's fingerprint, may include various forms of mechanisms that may guide or sort light beams incident onto the sensor layer. For example, the biometric sensor (e.g., fingerprint scanning sensor) of the optical structure may include a prism, a pin hole array, a liquid crystal cell array, and a micro-lens array. The prism-containing optical biometric sensor may advantageously be adopted in door locks, e.g., to manage entrance or exit to/from a certain place. However, a refractive lens may be difficult to equip in a small electronic device, e.g., a mobile communication terminal. A pin hole array, a liquid crystal cell array, or a micro-lens array may be easy to place in a small electronic device, but they are not workable enough to give detection of an image containing as much information as required for user authentication. For example, a biometric sensor with a pin hole array is required to leave an adequate gap between the pin holes to provide an environment to avoid the superposition of light-based pieces of object information. However, the limited space inside the electronic device would not make it possible. The same may be true for optical sensors with either a liquid cell array or a micro-lens array.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and method for an optical sensor capable of detecting an image containing a sufficient amount of information required for identifying the object while permitting the superposition of object information (e.g., incident light) or an electronic device including such an optical sensor.

Another aspect of the disclosure is to provide an apparatus and method for an optical sensor capable of obtaining biometric information (e.g., the user's fingerprint) necessary for user authentication or an electronic device including such an optical sensor.

Additional aspects will be set forth in part in the description which follows and, in part, will be apparent from the description, or may be learned by practice of the presented embodiments.

In accordance with an aspect of the disclosure, an electronic device is provided. The electronic device includes an optical sensor, the optical sensor comprising a lighting device configured to emit light, a sensor layer including an array of sensors configured to detect first image information corresponding to an object from light reflected by the object, and a filter layer including openings configured to transmit the light reflected by the object, the filter layer disposed on the sensor layer, wherein the first image information is different from an image of the object identified with naked eyes.

In accordance with an aspect of the disclosure, an electronic device is provided. An electronic device includes an optical sensor, the optical sensor comprising a lighting device configured to emit light, a sensor layer including an array of sensors configured to detect first image information corresponding to an object from light reflected by the object, and a filter layer including openings configured to transmit the light reflected by the object, the filter layer disposed on the sensor layer, wherein the openings may be arrayed to form a coded pattern.

In accordance with another aspect of the disclosure, the processor of the electronic device may produce second image information corresponding to the object by the convolution of a restored pattern corresponding to the coded pattern and image information detected by the sensor layer and may perform user authentication based on the second image information.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
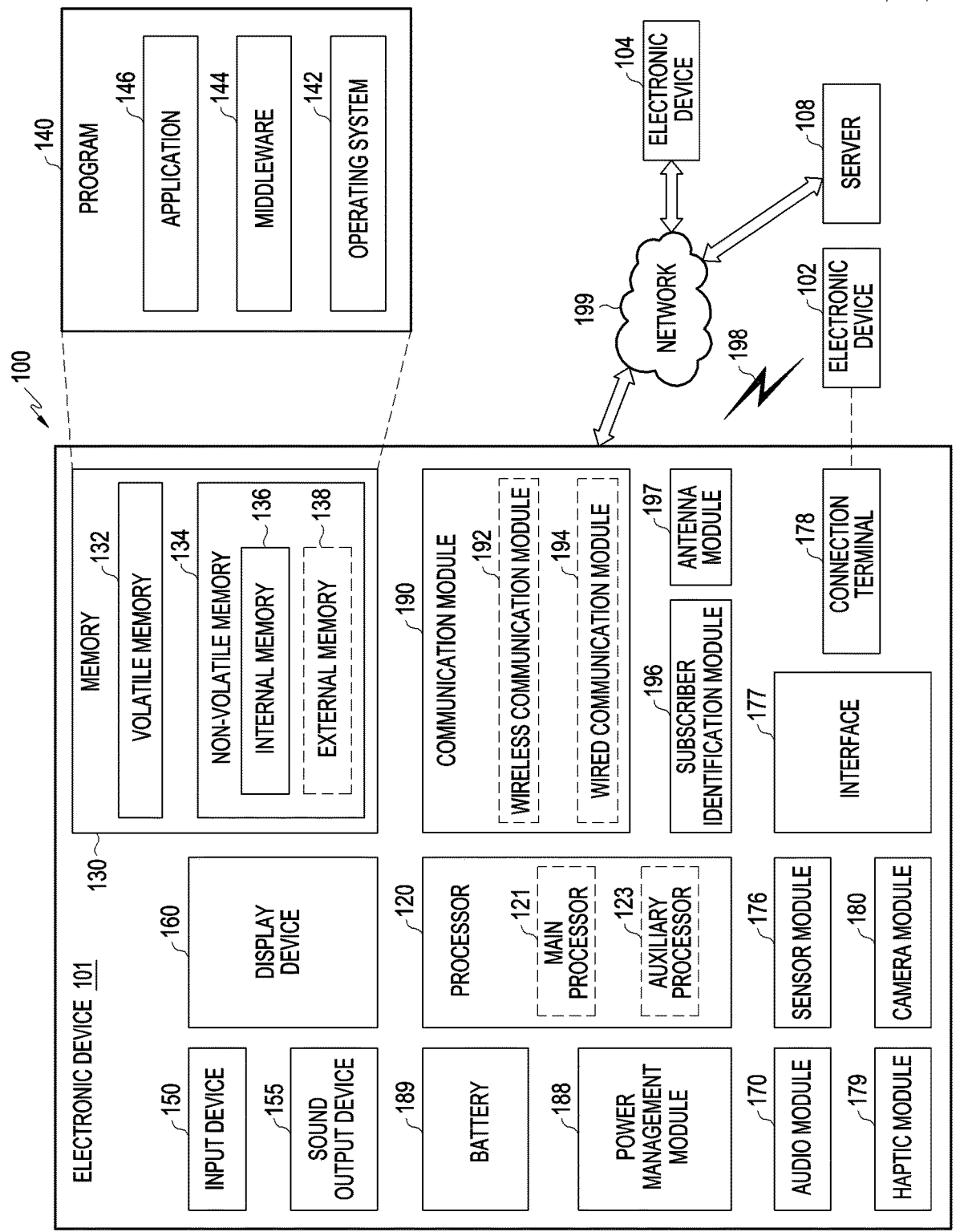
FIG. 1 is a block diagram illustrating an electronic device in a network environment according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Various changes may be made to the disclosure, and the disclosure may come with a diversity of embodiments. Some embodiments of the disclosure are shown and described in connection with the drawings. However, it should be appreciated that the disclosure is not limited to the embodiments, and all changes and/or equivalents or replacements thereto also belong to the scope of the disclosure.

The terms coming with ordinal numbers such as 'first' and 'second' may be used to denote various components, but the components are not limited by the terms. The terms are used only to distinguish one component from another. For example, a first component may be denoted a second component, and vice versa without departing from the scope of the disclosure. The term "and/or" may denote a combination(s) of a plurality of related items as listed or any of the items.

The terms "front," "rear surface," "upper surface," and "lower surface" are relative ones that may be varied depending on directions in which the figures are viewed, and may be replaced with ordinal numbers such as "first" and "second." The order denoted by the ordinal numbers, first and second, may be varied as necessary.

The terms as used herein are provided merely to describe some embodiments thereof, but not to limit the disclosure. It is to be understood that the singular forms "a," "an," and "the" include plural references unless the context clearly dictates otherwise. It will be further understood that the terms "comprise" and/or "have," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which the embodiments of the disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "electronic device" may be any device with a touch panel, and the electronic device may also be referred to as a terminal, a portable terminal, a mobile terminal, a communication terminal, a portable communication terminal, a portable mobile terminal, or a display apparatus.

For example, the electronic device may be a smartphone, a mobile phone, a navigation device, a game device, a TV, a head unit for vehicles, a laptop computer, a tablet computer, a personal media player (PMP), or a personal digital assistant (PDA). The electronic device may be implemented as a pocket-sized portable communication terminal with a radio communication function. According to an embodiment of the disclosure, the electronic device may be a flexible device or a flexible display.

The electronic device may communicate with an external electronic device, e.g., a server, or may perform tasks by interworking with such an external electronic device. For example, the electronic device may transmit an image captured by a camera and/or location information detected by a sensor to a server through a network. The network may include, but is not limited to, a mobile or cellular communication network, a local area network (LAN), a wireless local area network (WLAN), a wide area network (WAN), the Internet, or a small area network (SAN).

FIG. 1 is a block diagram illustrating an electronic device in a network environment according to an embodiment of the disclosure.

Figure 2:
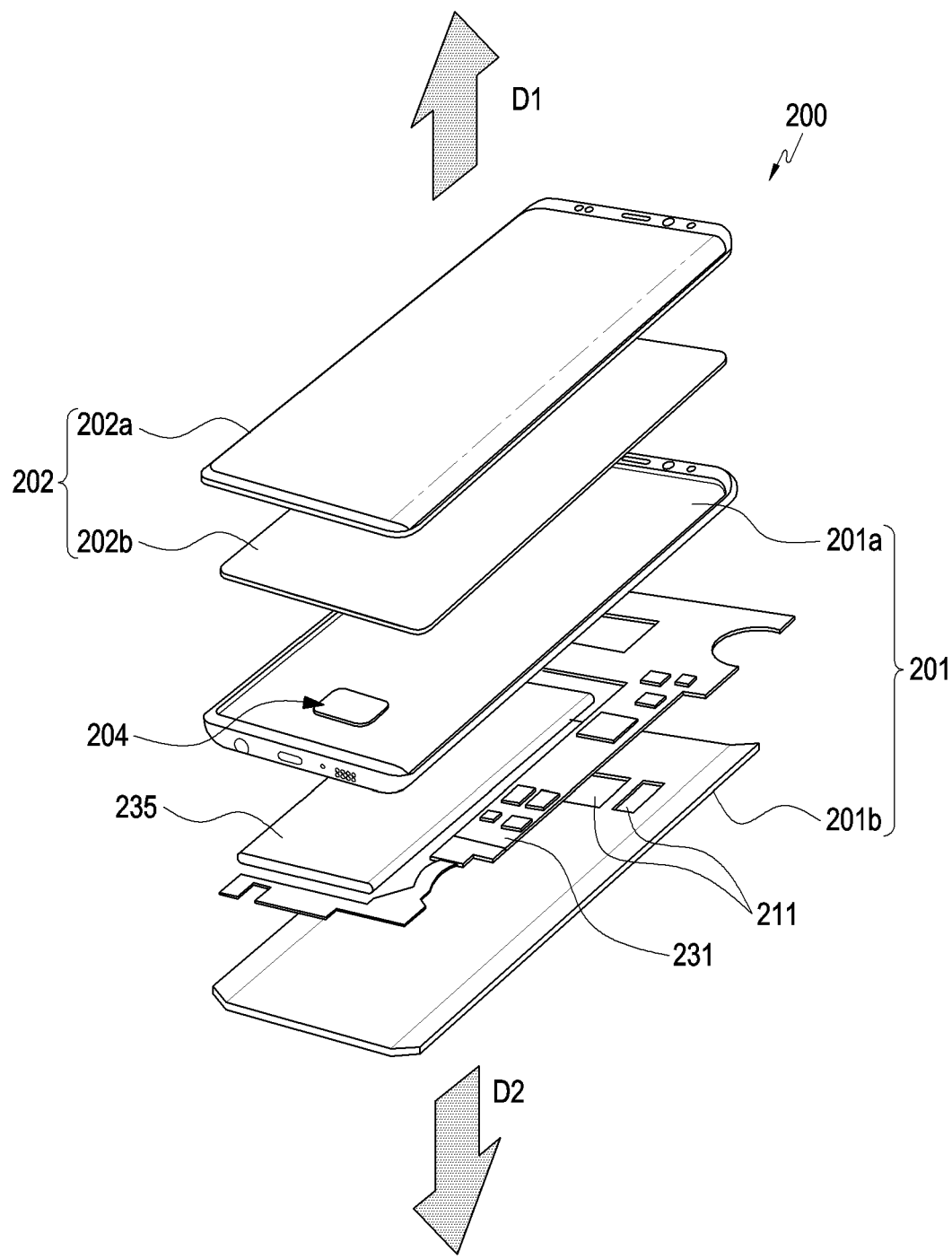
FIG. 2 is an exploded perspective view illustrating an electronic device including an optical sensor according to an embodiment of the disclosure.

Referring to FIG. 1, an electronic device 101 in a network environment 100 may be the whole or part of, e.g., an electronic device 200 of FIG. 2, and may communicate with an external electronic device 102 via a first network 198 (e.g., a short-range wireless communication network), or an external electronic device 104 or a server 108 via a second network 199 (e.g., a long-range wireless communication network). According to an embodiment, the electronic device 101 may communicate with the external electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, the electronic device 101 may exclude at least one (e.g., the display device 160 or the camera module 180) of the components or add other components. In some embodiments, some components may be implemented to be integrated together, e.g., as if the sensor module 176 (e.g., a fingerprint sensor, an iris sensor, or an illuminance sensor) is embedded in the display device 160 (e.g., a display).

The processor 120 may drive, e.g., software (e.g., a program 140) to control at least one other component (e.g., a hardware or software component) of the electronic device 101 connected with the processor 120 and may process or compute various data. The processor 120 may load and process a command or data received from another component (e.g., the sensor module 176 or the communication module 190) on a volatile memory 132, and the processor 120 may store resultant data in a non-volatile memory 134. According to an embodiment, the processor 120 may include a main processor 121 (e.g., a central processing unit (CPU) or an application processor (AP)) and an auxiliary processor 123 that is operable independently from the main processor 121. In addition to, or instead of, the main processor 121, the auxiliary processor 123 may include a graphics processing unit (GPU), an image signal processor, a sensor hub processor, or a communication processor that consumes less power than the main processor 121 or is specified for a designated function. The auxiliary processor 123 may be operated separately from or embedded in the main processor 121.

In such case, the auxiliary processor 123 may control at least some of functions or states related to at least one (e.g., the display device 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., performing an application). According to an embodiment, the auxiliary processor 123 (e.g., an image signal processor or a communication processor) may be implemented as part of another component (e.g., the camera module 180 or the communication module 190) functionally related to the auxiliary processor 123. The memory 130 may store various data used by at least one component (e.g., the processor 120) of the electronic device 101, e.g., software (e.g., the program 140) and input data or output data for a command related to the software. The memory 130 may include the volatile memory 132 or the non-volatile memory 134.

The program 140, as software stored in the memory 130, may include, e.g., an operating system (OS) 142, middleware 144, or an application 146.

The input device 150 may be a device for receiving a command or data, which is to be used for a component (e.g., the processor 120) of the electronic device 101, from an outside (e.g., a user) of the electronic device 101. The input device 150 may include, e.g., a microphone, a mouse, or a keyboard.

The sound output device 155 may be a device for outputting sound signals to the outside of the electronic device 101. The sound output device 155 may include, e.g., a speaker which is used for general purposes, such as playing multimedia or recording and playing, and a receiver used for call receiving purposes only. According to an embodiment, the receiver may be formed integrally or separately from the speaker.

The display device 160 may be a device for visually providing information to a user of the electronic device 101. The display device 160 may include, e.g., a display, a hologram device, or a projector and a control circuit for controlling the display, hologram device, or projector. According to an embodiment, the display device 160 may include touch circuitry or a pressure sensor capable of measuring the strength of a pressure for a touch.

The audio module 170 may convert a sound into an electrical signal and vice versa. According to an embodiment, the audio module 170 may obtain a sound through the input device 150 or output a sound through the sound output device 155 or an external electronic device (e.g., the external electronic device 102 (e.g., a speaker or a headphone) wiredly or wirelessly connected with the electronic device 101.

The sensor module 176 may generate an electrical signal or data value corresponding to an internal operating state (e.g., power or temperature) or external environmental state of the electronic device 101. The sensor module 176 may include, e.g., a gesture sensor, a gyro sensor, an atmospheric pressure sensor, a magnetic sensor, an acceleration sensor, a grip sensor, a proximity sensor, a color sensor, an infrared (IR) sensor, a bio sensor, a temperature sensor, a humidity sensor, or an illuminance sensor.

The interface 177 may support a designated protocol enabling a wired or wireless connection with an external electronic device (e.g., the external electronic device 102). According to an embodiment, the interface 177 may include a high definition multimedia interface (HDMI), a universal serial bus (USB) interface, a secure digital (SD) card interface, or an audio interface.

A connecting terminal 178 may include a connector, e.g., an HDMI connector, a USB connector, an SD card connector, or an audio connector (e.g., a headphone connector), which is able to physically connect the electronic device 101 with an external electronic device (e.g., the external electronic device 102).

The haptic module 179 may convert an electrical signal into a mechanical stimulus (e.g., a vibration or motion) or electrical stimulus which may be recognized by a user via his tactile sensation or kinesthetic sensation. The haptic module 179 may include, e.g., a motor, a piezoelectric element, or an electric stimulator.

The camera module 180 may capture a still image or moving images. According to an embodiment, the camera module 180 may include one or more lenses, an image sensor, an image signal processor, or a flash.

The power management module 188 may be a module for managing power supplied to the electronic device 101. The power management module 188 may be configured as at least part of, e.g., a power management integrated circuit (PMIC).

The battery 189 may be a device for supplying power to at least one component of the electronic device 101. The battery 189 may include, e.g., a primary cell which is not rechargeable, a secondary cell which is rechargeable, or a fuel cell.

The communication module 190 may support establishing a wired or wireless communication channel between the electronic device 101 and an external electronic device (e.g., the external electronic device 102, the external electronic device 104, or the server 108) and performing communication through the established communication channel. The communication module 190 may include one or more communication processors that are operated independently from the processor 120 (e.g., an application processor) and supports wired or wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of the wireless communication module 192 and the wired communication module 194 may be used to communicate with an external electronic device through a first network 198 (e.g., a short-range communication network, such as bluetooth, wireless-fidelity (Wi-Fi) direct, or infrared data association (IrDA)) or a second network 199 (e.g., a long-range communication network, such as a cellular network, the Internet, or a communication network (e.g., LAN or wide area network (WAN)). The above-enumerated types of communication modules 190 may be implemented in a singe chip, where at least some of the modules are integrated, or individually in separate chips.

According to an embodiment, the wireless communication module 192 may differentiate and authenticate the electronic device 101 in the communication network using user information stored in the subscriber identification module 196.

The antenna module 197 may include one or more antennas for transmitting or receiving a signal or power to/from an outside. According to an embodiment, the communication module 190 (e.g., the wireless communication module 192) may transmit or receive a signal to/from an external electronic device through an antenna appropriate for a communication scheme.

FIG. 2 is an exploded perspective view illustrating an electronic device including an optical sensor according to an embodiment of the disclosure.

Figure 3:
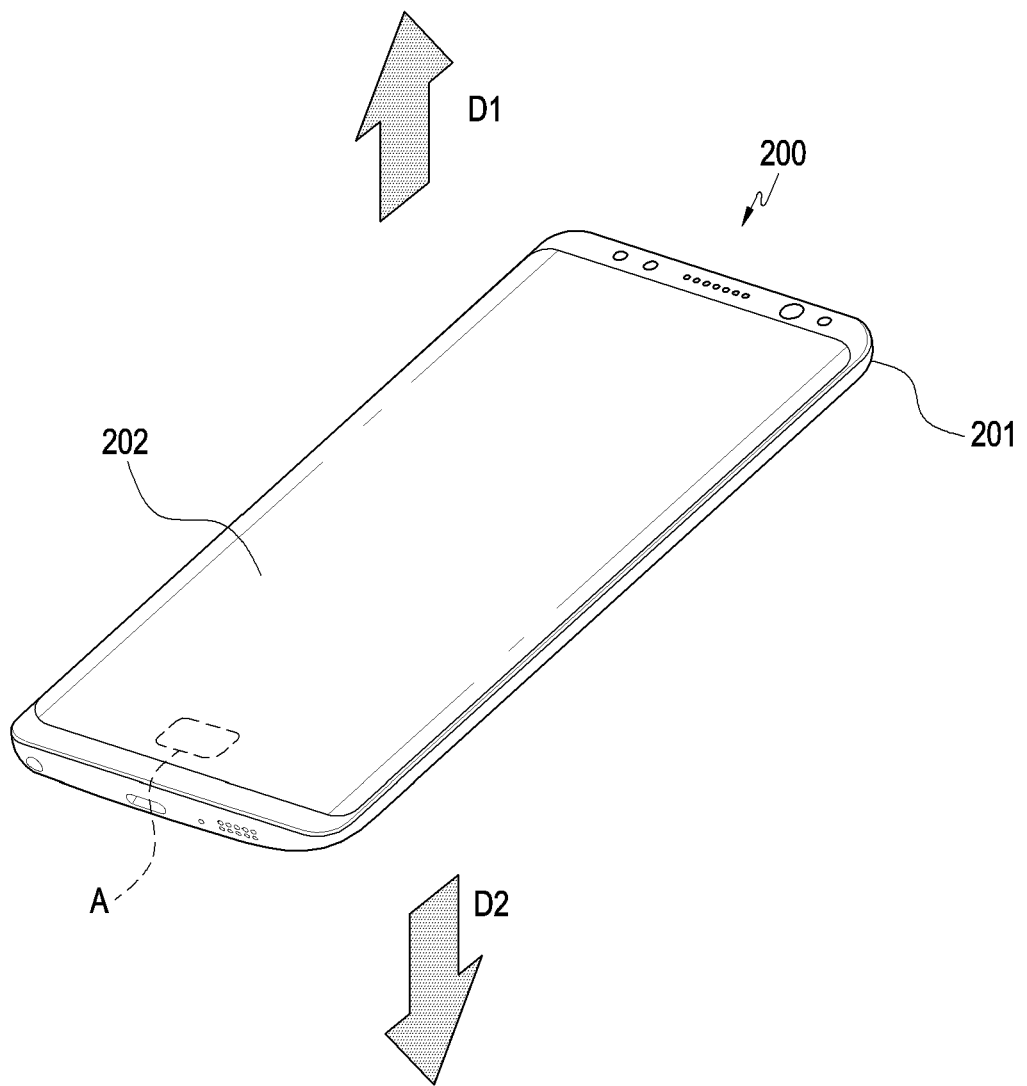
FIG. 3 is a perspective view illustrating an electronic device including an optical sensor according to an embodiment of the disclosure.

FIG. 3 is a perspective view illustrating an electronic device including an optical sensor according to an embodiment of the disclosure.

Hereinafter, the 'optical sensor' denoted with reference number 204 may also be referred to as a 'fingerprint recognition sensor,' with the 'optical sensor' and 'fingerprint recognition sensor' denoted with the same reference number. However, the 'optical sensor' as used herein is not necessarily limited to the 'fingerprint recognition sensor.' For example, the fingerprint recognition sensor 204 may include the function of detecting the user's iris image or vein image or the user's motion. According to an embodiment, the optical sensor denoted with reference number 204 may be any one of a camera, an infrared (IR) sensor, an illuminance sensor, a motion sensor, a proximity sensor, and a color sensor, or a combination of two or more thereof. For example, although, as an example of the optical sensor denoted with reference number 204, the 'fingerprint recognition sensor' is described below, embodiments of the disclosure are not limited thereto, but it should rather be appreciated that the optical sensor may include other various optical structure-based sensors.

Referring to FIGS. 2 and 3, according to an embodiment, an electronic device 200 (e.g., the electronic devices 101, 102, or 104 of FIG. 1) may include a fingerprint recognition sensor 204 (e.g., an optical sensor or the sensor module 176 of FIG. 1). The fingerprint recognition sensor 204 may be embedded in, e.g., a display panel 202b or may be stacked on the display panel 202b. According to an embodiment, the fingerprint recognition sensor 204 may include sensors (e.g., first to eighth sensors S1, S2, S3, ..., S8 of FIG. 8) for detecting first image information corresponding to an object (e.g., the user's fingerprint) from light reflected by the object. The 'first image information' may mean information about light, e.g., brightness information, filtered by a coded pattern (e.g., a coded pattern 443b of FIG. 6) that is formed by openings of a filter layer (e.g., a filter layer 343 of FIG. 4) described below, after reflected by the object, and this may differ from an actual object image (e.g., an image identified with the naked eye). For example, a sensor layer (e.g., a sensor layer 341 of FIG. 4) of the fingerprint recognition sensor 204 may detect brightness information from light that, after reflected by the object, is partially filtered and incident. According to an embodiment, a processor (e.g., the processor 120 of FIG. 1) of the electronic device 200 may produce second image information from information regarding the coded pattern including an array of openings and the first image information detected by the sensors S1, S2, S3, ..., S8, and the processor may perform user authentication based on the first image information or the second image information.

According to an embodiment, the electronic device 200 may include a housing 201 and a display device 202 (e.g., the display device 160 of FIG. 1). The housing 201 may have at least one circuit board 231 and a battery 235 (e.g., the battery 189 of FIG. 1) received therein. According to an embodiment, the modules and/or devices of FIG. 1 may be implemented in integrated circuit (IC) chips or electronic parts and be mounted on the circuit board 231. Although the housing (e.g., the housing 201) of the electronic device is shaped substantially as a bar forming the outer look of the electronic device, embodiments of the disclosure are not limited thereto. For example, according to an embodiment, the electronic device may encompass wearable electronic devices, navigation devices, game players, TVs, head units for vehicles, laptop computers, tablet PCs, portable media players (PMPs), personal digital assistants (PDAs), office multi-functional copiers, home appliances (e.g., refrigerators, ovens, or vacuums), home or office door-mounted security devices, or various medical devices. For example, embodiments of the disclosure are not limited to the electronic devices described below. According to an embodiment, an optical sensor or an electronic device including an optical sensor may provide functions for object imaging, user authentication, and detection of operational environments.

According to an embodiment, the housing 201 may include a housing member 201a and a cover plate 201b. The housing 201 may include a first surface (e.g., a front surface) facing in a first direction D1, a second surface (e.g., a rear surface) facing in a second direction D2 which is opposite to the first direction D1, and a side wall at least partially surrounding the space between the first surface and the second surface. According to an embodiment, the housing member 201a may form a space to receive, e.g., the circuit board 231. The cover plate 201b may be coupled to the housing member 201a, forming the second surface of the housing 201. According to an embodiment, the first surface of the housing 201 may be at least partially open, and the display device 202 may be combined, closing the first surface of the housing 201. For example, the housing 201 and the display device 202 are coupled together, substantially forming the outer appearance of the electronic device 200.

According to an embodiment, the cover plate 201b may be substantially integrally formed and manufactured with the housing member 201a. For example, the housing 201 may be formed in a uni-body structure. According to an embodiment, the cover plate 201b may include at least one opening portion 211. As used herein, the term "opening portion" may mean a through-hole formed to pass through the cover plate 201b from the inside thereof to the outside or may otherwise mean a transparent portion that may transmit light in an optical/visual manner but does not connect the inner space of the cover plate 201b to the outer space of the cover plate 201b. According to an embodiment, the fingerprint recognition sensor 204 may be disposed corresponding to, e.g., the opening portion 211 on the cover plate 201b.

According to an embodiment, the display device 202 may include the display panel 202b and a window member 202a protecting the display panel 202b. The window member 202a may be mounted in the first surface of the housing 201, forming a portion of the outer appearance of the electronic device 200. According to an embodiment, the display panel 202b may include, e.g., a liquid crystal display (LCD), an organic light emitting diode (OLED)-based display, an active OLED-based display, or a micro LED-based display. According to an embodiment, a display panel (e.g., the display panel 202b) may form the whole or part of a display equipped in a wearable electronic device, a TV, a computer monitor, a refrigerator or other home appliance, a control panel of an office multi-functional copier, or a home video phone device.

According to an embodiment, the optical sensor, e.g., the fingerprint recognition sensor 204, may be stacked on the display device 202 or may be provided as part of the display device 202. In the structure in which the fingerprint recognition sensor 204 is stacked on the display device 202 or provided as part of the display device 202, part of the display device 202 may be utilized as a lighting device or filter layer of the fingerprint recognition sensor 204. Alternatively, the fingerprint recognition sensor 204 may be disposed independently from the display device. For example, according to an embodiment, the fingerprint recognition sensor of the electronic device may be manufactured as an independent part or module that may be disposed corresponding to one of the opening portions 211 formed in the cover plate 201b.

The structure of the fingerprint recognition sensor is described below in greater detail with reference to, e.g., FIG. 4.

Figure 4:
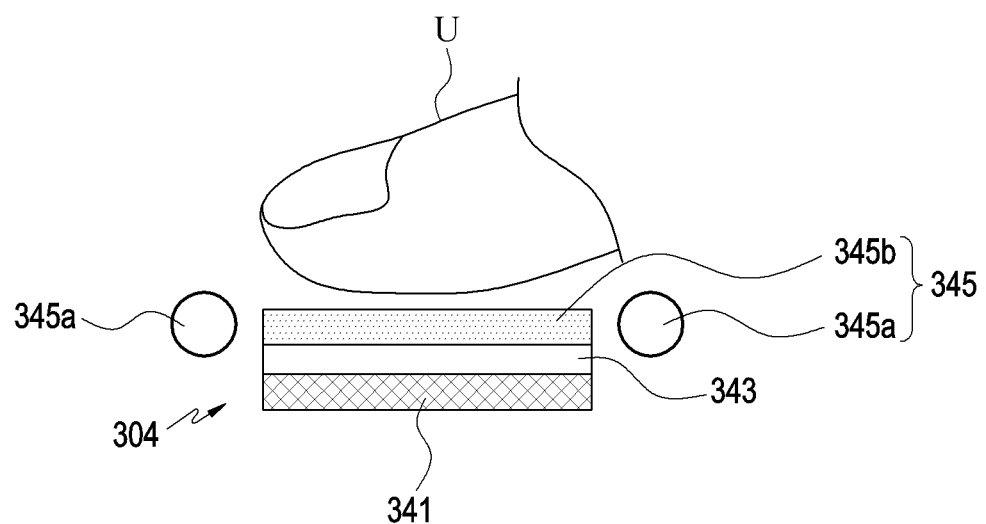
FIG. 4 is a view illustrating a structure of an optical sensor in an electronic device according to an embodiment of the disclosure.

FIG. 4 is a view illustrating a structure of an optical sensor in an electronic device according to an embodiment of the disclosure.

Referring to FIG. 4, an optical sensor, e.g., a fingerprint recognition sensor 304, may include a sensor layer 341, a filter layer 343, and a lighting device 345. The lighting device 345 may radiate light to, e.g., the user's finger U. The sensor layer 341 may detect the light reflected by the object, thereby detecting first image information corresponding to the object. As mentioned above, the first image information detected by the sensor layer 341 may differ from an object image identified with the naked eye. The filter layer 343 may include openings (e.g., openings 343a and 343b of FIGS. 5 and 6) that transmit the light reflected by the object. The openings 343a or 343b may be arranged in a coded pattern (e.g., a coded pattern 443a of FIG. 5).

According to an embodiment, the sensor layer 341 may include an array of sensors (e.g., the first to eighth sensors S1, S2, S3, . . . , S8 of FIG. 8) for detecting image information from the light reflected by the object. For example, the sensor layer 341 may be formed as part of a semiconductor package and may be disposed to face the lighting device 345, with the filter layer 343 interposed therebetween. Each sensor constituting the sensor layer 341 may detect image information (e.g., brightness information) corresponding to at least a portion of the object, e.g., the user's fingerprint, from the light transmitted through the filter layer 343.

According to an embodiment, the filter layer 343 may be disposed between the sensor layer 341 and at least a portion of the lighting device 345 to guide or sort light beams incident onto the sensor layer 341. The filter layer 343 may have a thin film shape substantially formed of a light-blocking material, e.g., a light blocking film, and the filter layer 343 may include a plurality of openings that transmit light. For example, the light reflected by the object may be incident through the openings of the filter layer 343 to the sensor layer 341. The openings may be arranged in the filter layer 343 to form a coded pattern.

According to an embodiment, the correlation between the coded pattern of the openings of the filter layer 343 and a restored pattern described below may meet the delta function. For example, image information detected by the sensor layer 341 may be based on a combination of the coded pattern of the openings in the filter layer 343 and an image of the object itself. The actual image of the object or image information necessary for, e.g., user authentication, may be restored from the brightness information (e.g., the first image information) detected by the sensor layer 341 based on the information contained in the restored pattern.

Various examples of the coded pattern of the openings in the filter layer 343 are described below with reference to FIGS. 5 to 7.

Figure 5:
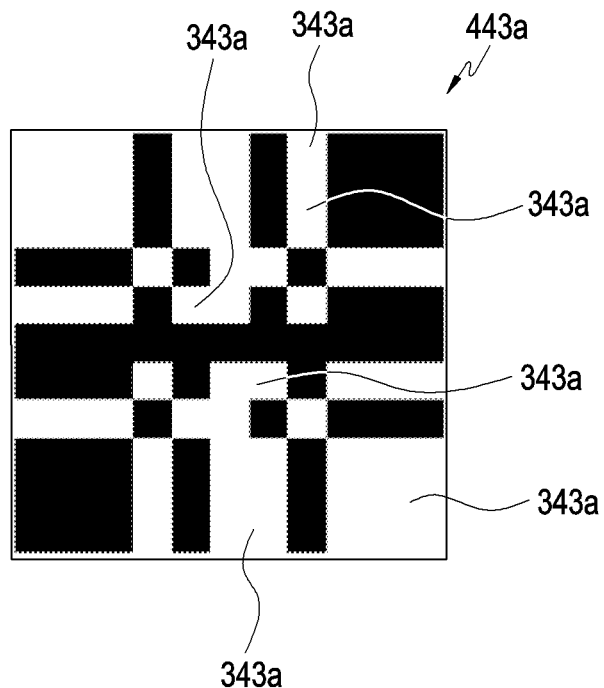
FIGS. 5, 6, and 7 are views illustrating filter layers of an optical sensor in an electronic device according to various embodiments of the disclosure.
Figure 6:
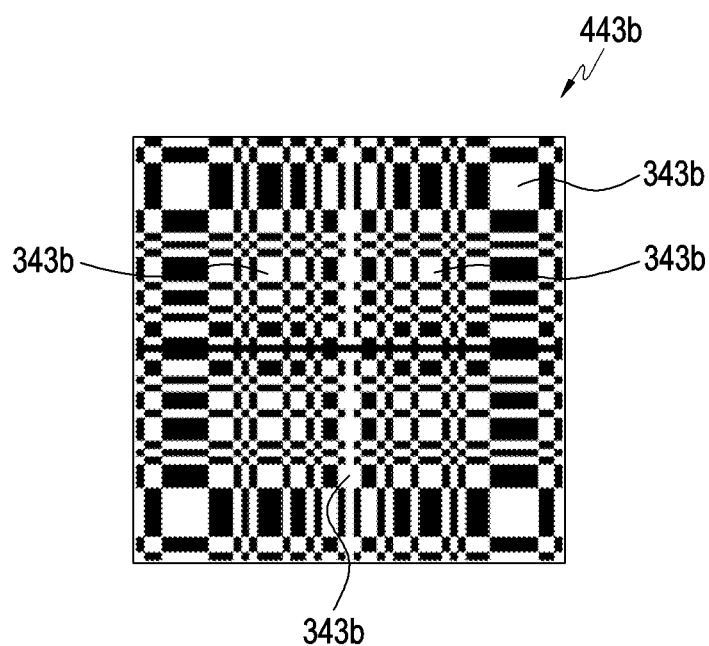
Figure 7:
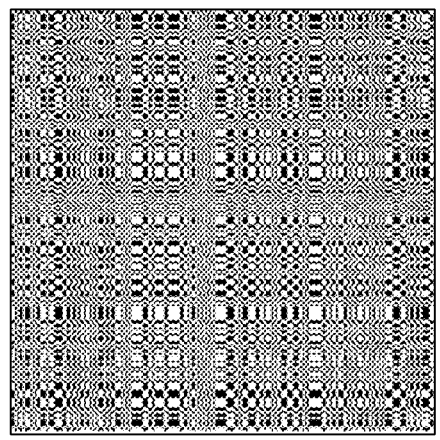

FIGS. 5 to 7 illustrate filter layers of an optical sensor in an electronic device according to various embodiments of the disclosure. For example, FIGS. 5, 6, and 7, respectively, illustrate coded patterns each of which is an array of, e.g., the openings.

Referring to FIGS. 5 to 7, openings 343a or 343b each may be shaped substantially as a two-dimensional (2D) rectangle. Although each opening is mentioned as having a 2D rectangular shape, it may be appreciated that each opening 343a or 343b indeed has a three-dimensional (3D) rectangular shape because, in practice, the filter layer (e.g., the filter layer 343 of FIG. 4) is substantially formed of a thin film—i.e., the filter layer 343 has a predetermined thickness. According to an embodiment, the openings 343a or 343b may be arranged in a matrix of 40009*40009 in the area where the light reflected by the object is incident. For example, light shielding regions between the openings 343a or 343b may be arranged to form a 2*2 matrix or 40009*40009 matrix.

When the smallest, square opening as shown in FIGS. 5 to 7, is referred to as a 'unit opening,' each unit opening may be disposed adjacent to its neighbor unit opening in contact with each other or with a light shielding region interposed therebetween. For example, referring to FIGS. 5 to 7, some openings 343a or 343b each may be formed only of a unit opening, and other openings 343a or 343b each may be shaped as a rectangle or a larger square as a combination of a few unit openings. The openings 343a or 343b may be arranged regularly and repetitively or irregularly, forming the coded patterns 443a, 443b, and 443c. According to an embodiment, the size of each unit opening may correspond to the size of each sensor (e.g., the first sensor S1 of FIG. 8) of the sensor layer. The more openings 343a or 343b are positioned in the area that the filter layer 343 provides, or the larger it is, the larger its aperture ratio is. For example, as the number of the openings 343a or 343b in the area that the filter layer 343 provides increases, the area where light may be transmitted may broaden. Such aperture ratio may determine the amount of light incident onto the sensor layer 341. As the openings 343a or 343b form a coded pattern 443a, 443b, or 443c in the filter layer 343, the filter layer 343 may be made slimmer and provide an increased aperture ratio.

According to an embodiment, since the filter layer 343 is thin film-shaped and has a higher aperture ratio, each sensor of the sensor layer 341 is able to detect information about light beams reflected in different areas of the object. For example, one sensor may detect the superposition of image information about a plurality of areas of the object. The image (or image information) detected through the entire sensor layer 341 may contain information regarding a gradual or partial brightness variation and may differ from that of the object identified in practice with the naked eye. According to an embodiment, the above-described electronic device (e.g., the electronic device 200 of FIG. 2) or the fingerprint recognition sensor (e.g., the fingerprint recognition sensor 204 of FIG. 2 or 304 of FIG. 4) may produce image information necessary for user authentication or the actual image (or an image close thereto) of the object from the detected image (e.g., the first image information) based on the restored pattern corresponding to the coded pattern 443a, 443b, or 443c of the openings 343a or 343b. For example, the electronic device 200 or the fingerprint recognition sensor 204 may include a processor (e.g., the processor 120 of FIG. 1) and a memory (e.g., the memory 130 of FIG. 1). The memory 130 may store restored patterns corresponding to coded patterns 443a, 443b, and 443c formed by the openings in the filter layer 343. As set forth above, the coded pattern 443a, 443b, or 443c and its corresponding restored pattern has a correlation that meets the delta function. Thus, the processor 120 may produce and restore images of different areas of the object, each corresponding to a respective one of the sensors, from the image (or image information) detected by the sensor layer 341. For example, the processor 120 may restore and obtain image information necessary for user authentication or the actual image of the object from the first image information based on the restored pattern.

In a typical optical biometric sensor with a pin hole array, each pin hole needs to be long enough to force the coming light to pass straight or the inter-pin hole interval needs to be sufficiently broad to prevent light transmitted through a neighbor pin hole from being detected by the sensor of the sensor layer. However, securing a sufficient length for each pin hole may thicken the filter layer, and broadening the inter-pin hole interval to a sufficient degree may reduce the aperture ratio of the area that the filter layer provides. For example, the pin hole array-containing optical biometric sensor may be hard to reduce in thickness. Reducing thickness may inevitably widen the inter-pin hole interval, thus deteriorating the aperture ratio, e.g., light-receiving efficiency, of the sensor layer.

In contrast, according to an embodiment, since the optical sensor, e.g., the fingerprint recognition sensor, or the electronic device including the optical sensor, has a coded pattern of openings in the thin film-shaped filter layer, its thickness may be reduced while the light receiving efficiency of the sensor layer may be enhanced. Further, despite permitting the superposition of incident light beams, the actual image of the object may be restored by the restored pattern corresponding to the coded pattern, or such image information as enables stable user authentication may be produced.

Detecting and restoring image information using the filter layer are described below in further detail with reference of FIGS. 8 to 11.

Referring back to FIG. 4, the lighting device 345 may include, e.g., a light emitting device 345a and a waveguide device 345b. According to an embodiment, the light emitting device 345a, as a light source of the lighting device 345, may emit light. The waveguide device 345b may propagate the light emission to a certain area. The waveguide device 345b may be disposed on an outside surface of, e.g., the fingerprint recognition sensor 304 and may be disposed with one surface thereof facing or contacting the object (e.g., the user's finger U). According to an embodiment, the light emitting device 345a may be disposed on, at least, a side edge of the waveguide device 345b to emit light in a direction crossing the direction in which one surface of the waveguide device 345b faces. For example, the light emitting device 345a may emit light in a direction parallel with the surface of the waveguide device 345b. Alternatively, the lighting device 345 may include a portion of the light emitting layer of the display panel which is described below. Where the light emitting layer of the display panel is included as a portion of the lighting device 345, the light emitting device 345a may be replaced with the light emitting layer of the display panel. Light propagating through the waveguide device 345b may be reflected by the object to the sensor layer 341. For example, the light reflected by the object may be incident through the openings (e.g., the openings 343a of FIG. 5) of the filter layer 343 to the sensor layer 341.

According to an embodiment, the fingerprint recognition sensor 304 may be stacked on the display device (e.g., the display device 202 of FIG. 1) or provided as part of the display device. Where the fingerprint recognition sensor 304 is stacked on the display device or is provided as part of the display device, at least a portion of the light emitting layer of the display device (or display panel) may form part of the filter layer 343 while serving as the light emitting device of the lighting device 345. According to an embodiment, where the fingerprint recognition sensor 304 is stacked on the display device or is provided as part of the display device, a portion of the window member (e.g., the window member 202a of FIG. 2) of the display device may form at least a portion of the waveguide device 345b of the lighting device 345. The structure in which the fingerprint recognition sensor 304 is formed as part of the display device is described below in greater detail with reference to, e.g., FIG. 12.

Figure 8:
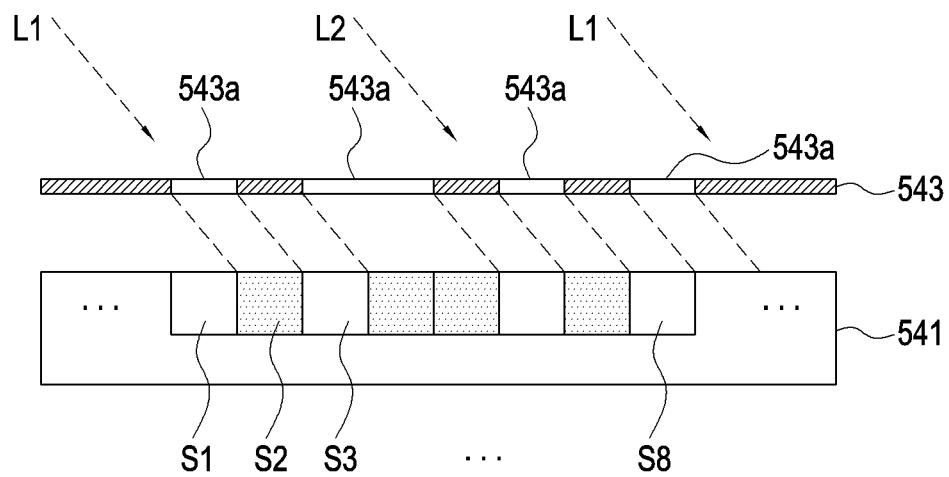
FIGS. 8, 9, and 10 are views illustrating a process of light being incident onto an optical sensor in an electronic device according to various embodiments of the disclosure.
Figure 9:
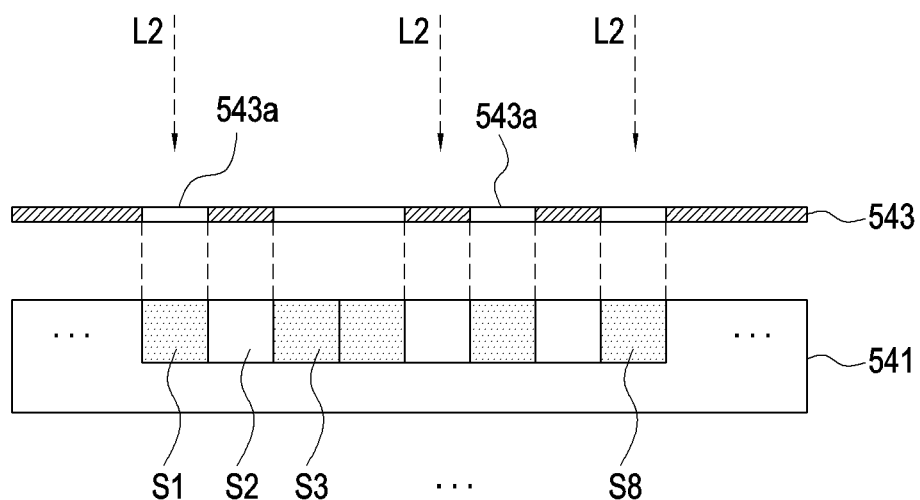
Figure 10:
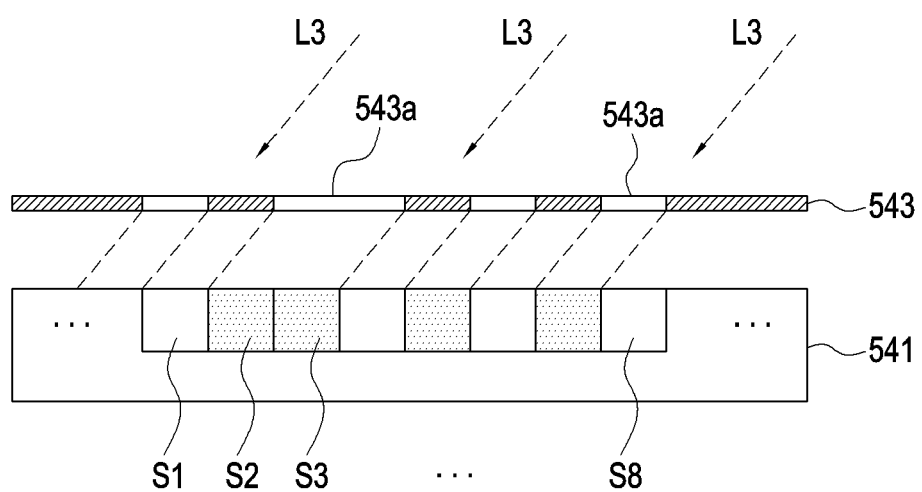

FIGS. 8 to 10 are views illustrating a process of light being incident onto an optical sensor (e.g., the fingerprint recognition sensor 304 of FIG. 4) in an electronic device according to an embodiment of the disclosure.

Figure 11:
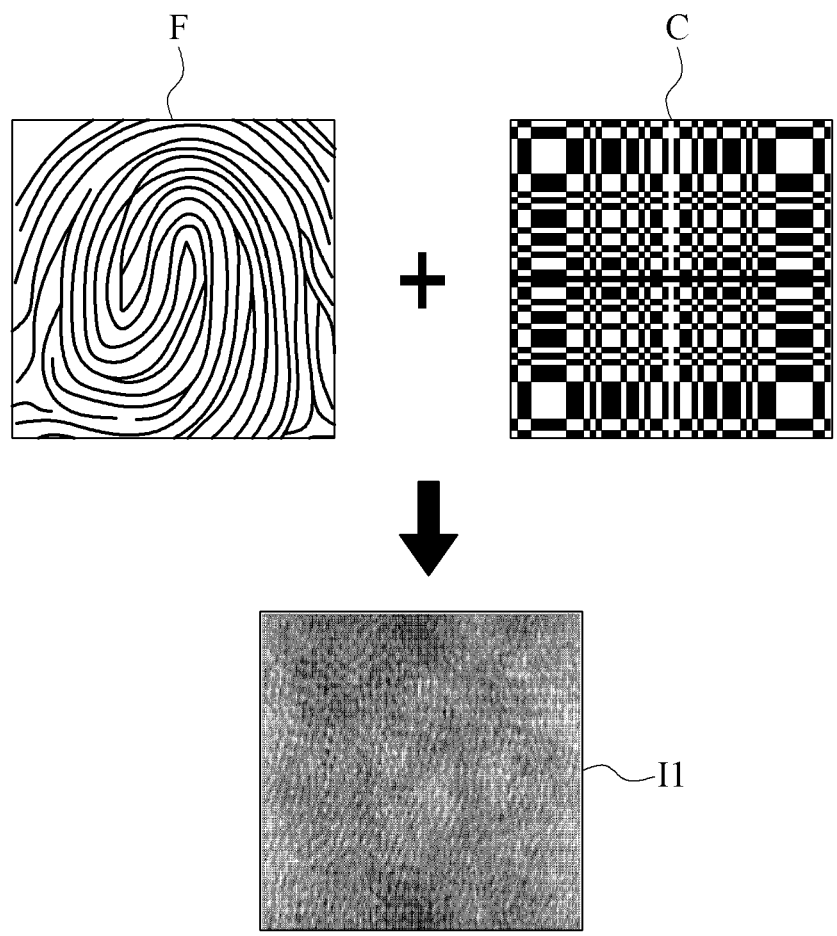
FIG. 11 is a view illustrating a process of detecting image information about an object by an optical sensor in an electronic device according to an embodiment of the disclosure.

FIG. 11 is a view illustrating a process of detecting image information about an object by an optical sensor (e.g., the sensor layer 341 of FIG. 4) in an electronic device according to an embodiment of the disclosure.

According to an embodiment, although a configuration of a sensor layer (e.g., the sensor layer 341) with a limited number of sensors is exemplified below, this is merely intended for the simplicity of description, and embodiments of the disclosure are not limited thereto. In practice, the optical sensor, e.g., the fingerprint recognition sensor or an iris sensor, may include more sensors and more openings, thus it may have a more complicated functional relationship and coded pattern in the filter layer than those described herein.

Referring to FIGS. 8 to 10, a filter layer 543 with a plurality of openings 543a (e.g., the openings 343a of FIG. 5 or 343b of FIG. 6) may be disposed on the sensor layer 541. Each sensor S1, S2, S3, . . . , S8 may detect image information (e.g., brightness information) from light incident through the openings 543a. The sensors S1, S2, S3, . . . , S8 may detect information about light beams incident in different directions through different openings. For example, the first sensor S1 may not detect first incident light L1 coming in a first inclined direction but can detect information about second incident light L2 and third incident light L3 respectively coming in a second inclined direction and a third inclined direction. For example, the first sensor S1 may detect image information about two different points in the object. The description goes on with the eighth sensor S8. The second incident light L2 comes to the eighth sensor S8 but the first incident light L1 and the third incident light L3 do not come to the eighth sensor S8. Further, when the object is positioned very adjacent or in contact with the above-described waveguide device (e.g., the waveguide device 345b of FIG. 4), the area of the object detected by the first sensor S1 may differ from the area of the object detected by the eighth sensor S8.

According to an embodiment, as set forth above, the sensors S1, S2, S3, . . . , S8 forming the sensor layer 541 detect information about the light reflected in different areas of the object. Thus, one point in the image detected by the sensor layer 541, e.g., brightness information detected by one of the sensors S1, S2, S3, . . . , S8, may include information about a plurality of different points of the object. The image detected by the sensor layer 541 is described with reference to FIG. 11.

Referring to FIG. 11, the reference denotations 'F,' 'C,' and 'I1,' respectively indicate the user's actual fingerprint, the coded pattern (e.g., the coded pattern 443a of FIG. 5, 443b of FIG. 6, or 443c of FIG. 7) of the openings (e.g., the openings 343b of FIG. 6) in the filter layer 543, and the image (hereinafter, 'first image information') detected by the sensor layer 541. Since the first image information I1 is information by the light filtered by the coded pattern (e.g., the coded pattern 443b of FIG. 6) of the filter layer after having been reflected by the object as set forth above, the first image information I1, unlike that of the object actually identified with the naked eye, contains gradual or partial brightness information.

The correlations for the areas of the object detected by the sensors S1, S2, S3, . . . , S8 through the coded pattern C are shown in Table 1 below.

TABLE 1

| Sensor | Object Area | | | | | | | |
|---|---|---|---|---|---|---|---|---|
| | 1 | 2 | 3 | 4 | 5 | 6 | 7 | 8 |
| S1 | ■ | | | | | | | |
| S2 | ● | | ▲ | | | | | |
| S3 | | | ■ | ▲ | | | | |
| S4 | | | ● | ■ | | | | |
| S5 | | | | ● | | ▲ | | |
| S6 | | | | | | ■ | | |
| S7 | | | | | | ● | | ▲ |
| S8 | | | | | | | | ■ |

First Incident Light (L1): ●/
Second Incident Light (L2): ■/
Third Incident Light (L3): ▲

As set forth in Table 1 above, one sensor may detect image information regarding different areas of the object, and image information about one area of the object may be detected by different sensors. For example, the second sensor S2 may detect image information about the first and third areas of the object, and the image information about the first area of the object may also be detected by the first sensor S1. According to an embodiment, the restored pattern corresponding to the coded pattern C may include information about the second incident light L2 coming to the first sensor S1 and information about the first incident light L1 coming to the second sensor. The processor, e.g., an image signal processor, of the electronic device may synthesize the image information detected by the first and second sensors S1 and S2 based on the restored pattern, restoring and obtaining an image regarding the first area of the object.

According to an embodiment, the restored pattern may include information about light coming to the fifth sensor S5 through the first incident light L1, information about light coming to the fourth sensor S4 through the second incident light L2, and information about light coming to the third sensor S3 through the third incident light L3, corresponding to the coded pattern C. The processor of the electronic device may synthesize the image information detected by the third to fifth sensors S3, S4, and S5 based on the restored pattern, restoring and obtaining an image regarding the fourth area of the object.

As set forth above, the fingerprint recognition sensor or the electronic device including the fingerprint recognition sensor, according to an embodiment, may restore the actual image (or an image close to the actual image) or produce information required for user authentication from the first image information I1 using the restored pattern corresponding to the coded pattern. For example, since the superposition of information about light incident onto each sensor S1, S2, S3, . . . , S8 is permitted in detecting the first image information, the aperture ratio of the filter layer (e.g., the filter layer 543 of FIG. 8) may be increased, thus leading to an increased light receiving efficiency. The increased light receiving efficiency may allow the fingerprint recognition sensor, or the electronic device including the same, to more quickly detect images containing the same level of identification information or more accurately detect image information within the same time period.

Figure 12:
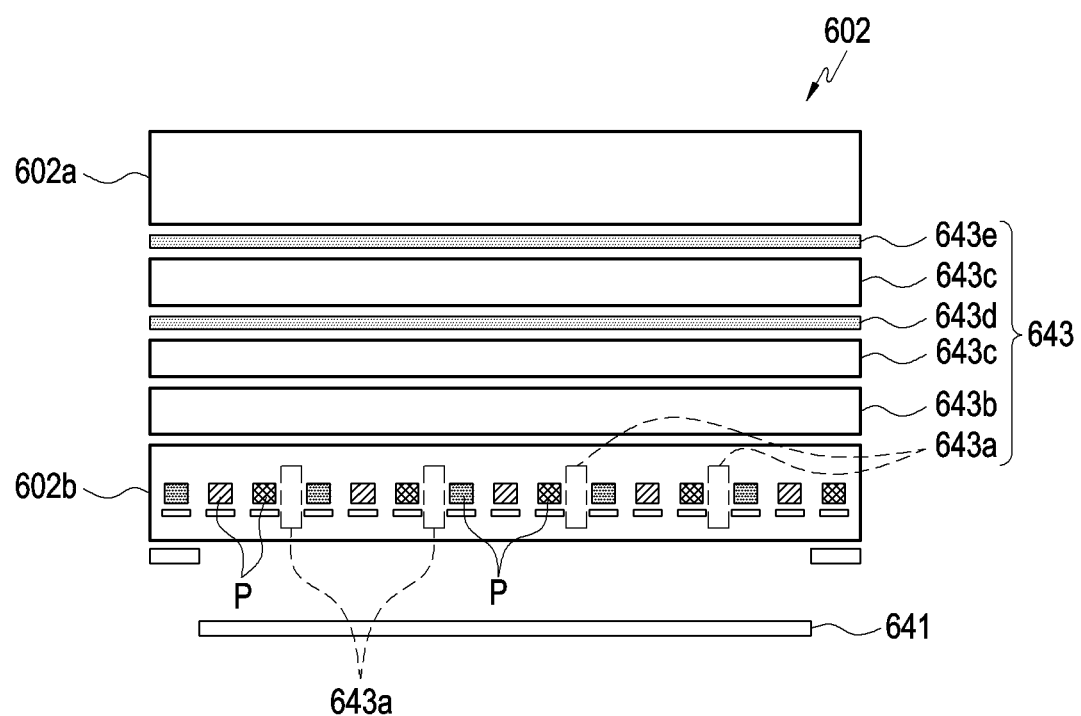
FIG. 12 is a view illustrating a structure of an optical sensor being embedded in a display device in an electronic device according to an embodiment of the disclosure.

FIG. 12 is a view illustrating a structure of an optical sensor being embedded in a display device in an electronic device according to an embodiment of the disclosure.

As set forth above, according to an embodiment, the optical sensor, e.g., the fingerprint recognition sensor, may be manufactured as a separate part from the display device in the electronic device and independently installed, or the optical sensor may be stacked on the display device or installed as part of the display device. In the exemplary configuration shown, the fingerprint recognition sensor is installed as part of the display device. In the configuration where the fingerprint recognition sensor is provided as part of the display device, at least a portion of the window member or the light emitting layer of the display panel may form a portion of the lighting device (e.g., the light emitting device or the waveguide device) of the fingerprint recognition sensor.

Referring to FIG. 12, a display device 602 may include a window member 602a and a display panel 602b. A sensor layer 641 (e.g., the sensor layer 341 of FIG. 4) for detecting object images may be disposed under the display panel 602b. According to an embodiment, the sensor layer 641 may substantially be formed of a semiconductor and may be attached onto the bottom of the display panel 602b. The display panel 602b may include pixels P emitting, at least, red, green, and blue light and pores (or air gaps) 643a between at least some of the pixels P. The 'pores' may mean areas that transmit light. For example, the display panel 602b, although generally blocking light, may partially transmit the light through the pores 643a. According to an embodiment, at least some of the pores 643a may be positioned in an area corresponding to the sensor layer 641. For example, some of the pores 643a may be provided as openings (e.g., the openings 343b of FIG. 6) as described above and may be arrayed to form a coded pattern (e.g., the coded pattern C of FIG. 11).

According to an embodiment, the display device 602 may include a polarizing plate(s) 643b or a retarder(s) 643c disposed between the window member 602a and the display panel 602b. The polarizing plate 643b or the retarder 643c may be provided, e.g., to optimize the image quality of the display device 602 and to guide or sort light beams incident onto the sensor layer 641. For example, the polarizing plate 643b or retarder 643c, along with the display panel 602b, may form a filter layer 643 (e.g., the filter layer 343 of FIG. 4).

The polarizing plate 643b and the retarder 643c may sequentially be stacked and attached to the window member 602a via, e.g., optical adhesive layers. According to an embodiment, to suppress or mitigate light reflection or refraction due to, e.g., differences in refractive index between the layers when stacking the polarizing plate 643b and the retarder 643c, an anti-reflection coat layer 643d and an index matching layer 643e may be provided between the layers. For example, the anti-reflection coat layer 643d and the index matching layer 643e may be provided between the polarizing plate 643b and the retarder 643c, between the retarder and the window member 602a, or, if there are a plurality of retarders 643c, between the retarders 643c. According to an embodiment, the anti-reflection coat layer 643d and the index matching layer 643e may be provided as part of the filter layer 643. The anti-reflection coat layer 643d and the index matching layer 643e may be coat layers that reflect light of a particular wavelength or transmit light of another wavelength. For example, given the spectrum of light detected by the sensor layer 641, the spectrum of light transmitted or reflected by the filter layer 643 or the coat layer included in the filter layer 643 may properly be designed.

According to an embodiment, the light emitting layer (e.g., the light emitting layer 621 of FIG. 13 described below) of the display panel 602b may function as a light emitting device to radiate light to the object. According to an embodiment, the window member 602a may protect the display panel 602b, and at least a portion thereof (e.g., portion A of FIG. 3) corresponding to the sensor layer 641 may function as the waveguide device (e.g., the waveguide device 345b of FIG. 4) of the lighting device. For example, in a typical scenario, light emitted from the pixels P is output through the window member 602a to the outside, thereby providing visual information to the user. However, when an object (e.g., the user's finger U as shown in FIG. 4) is positioned adjacent or in contact with the surface of the window member 602a in the area corresponding to the sensor layer 641, the light from the pixels P may be reflected by the object to the sensor layer 641. For example, at least a portion of the light emitted from the pixels P may be propagated through the window member 602a and be reflected by the object. The reflected light may sequentially pass through the window member 602a and the filter layer 643, e.g., the pores 643a of the coded pattern, to the sensor layer 641. According to an embodiment, the sensor layer 641 is disposed on the display panel 602b, and part of the light emitting layer and part of the window member 602a may be utilized as a lighting device and a waveguide device, respectively. According to an embodiment, the sensor layer may be installed independently from the display panel in which case a separate lighting device and a separate waveguide member may be provided on the sensor layer.

According to an embodiment, the sensor layer 641 may detect first image information corresponding to the object from the light that is reflected by the object and is then transmitted through, e.g., the filter layer 643. As described above in connection with FIGS. 8 to 11, the first image information detected by the sensor layer 641 may differ from that of the object identified in practice with the naked eye. The processor (e.g., the processor 120 of FIG. 1) of the electronic device may produce second image information, e.g., an actual image or an image close to the actual image, from the first image information by the convolution of the first image information based on the restored pattern stored in the memory (e.g., the memory 130 of FIG. 1). The restored pattern stored in the memory may correspond to the coded pattern of the pores 643a.

According to an embodiment, the processor of the electronic device may not restore the actual image using the restored pattern and the first image information but may produce information about particular areas necessary for user authentication. For example, when user authentication is carried out with the image detected by the sensor layer

641, the processor may produce the second image information by obtaining and restoring, e.g., image information about some preset area(s) of the object. According to an embodiment, where user authentication is performed by a fingerprint or iris image, the processor may only obtain and restore image information about some portion(s) of the detected image and then compare the stored user information with the restored image information, performing user authentication. Alternatively, while the sensor layer 641 is active, the sensor layer 641 may detect the user's action or the movement of the object in its corresponding area. The processor may execute an instruction or function (e.g., switching screens or operation modes) as per a preset process based on, e.g., the speed, direction, or displacement of the action detected by the sensor layer 641.

Figure 13:
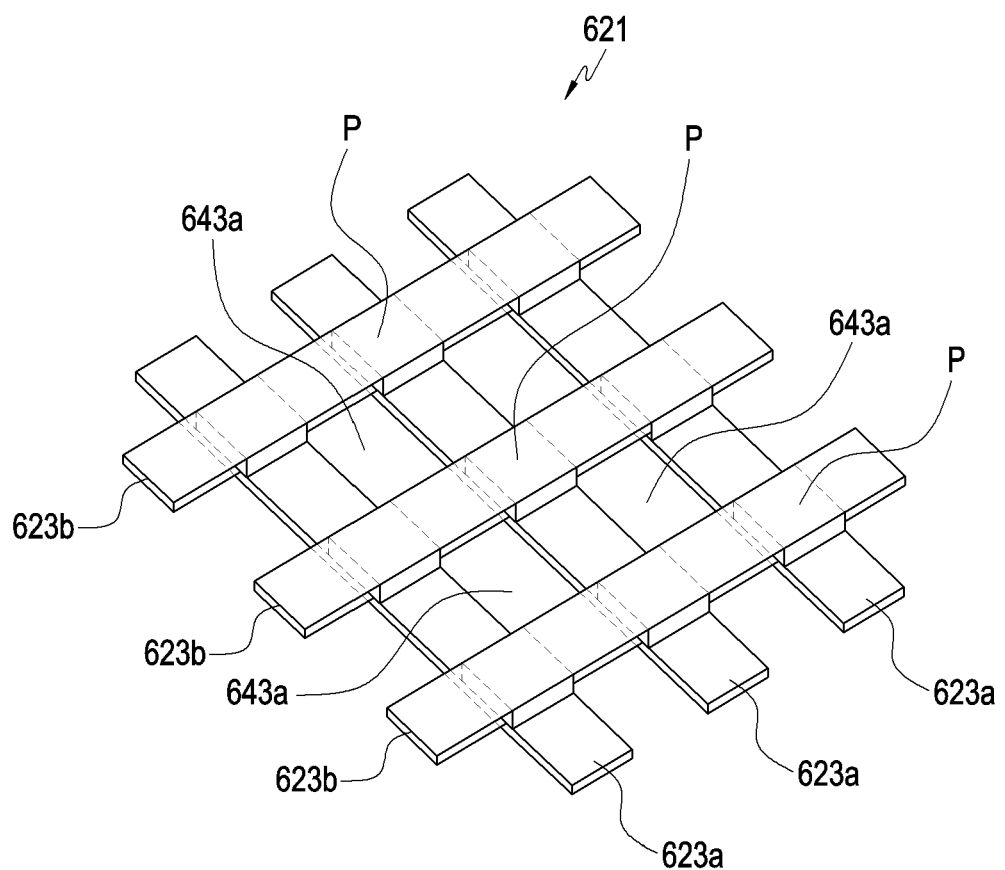
FIG. 13 is a view illustrating a light emitting layer of a display panel in an electronic device according to an embodiment of the disclosure.

FIG. 13 is a view illustrating a light emitting layer of a display panel in an electronic device according to an embodiment of the disclosure.

Figure 14:
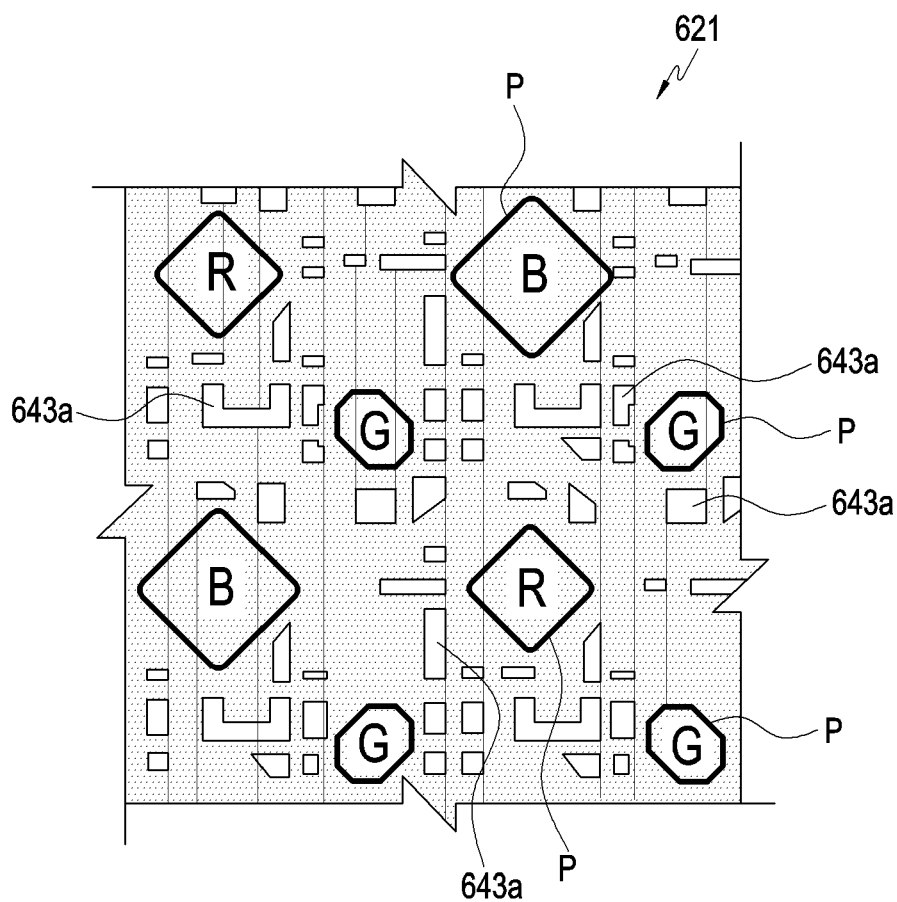
FIG. 14 is an enlarged plan view illustrating a portion of a light emitting layer of a display panel in an electronic device according to an embodiment of the disclosure.

FIG. 14 is an enlarged plan view illustrating a portion of a light emitting layer of a display panel in an electronic device according to an embodiment of the disclosure.

Referring to FIGS. 13 and 14, the display panel 602*b* may include (active) organic light emitting diodes (OLEDs). For example, a light emitting layer 621 of the display panel 602*b* may include a light emitting substance(s) encapsulated between two boards (not shown) and electrodes 623*a* and 623*b* for electrically controlling the light emitting substance(s). Among the electrodes, lower electrodes 623*a* may be, e.g., cathode electrodes that may be transparent or opaque. Among the electrodes, upper electrodes 623*b* may be, e.g., anode electrodes that may be transparent electrodes formed of, e.g., indium-tin oxide (ITO). The lower electrodes 623*a* and the upper electrodes 623*b* may be arranged to cross each other with the light emitting substance(s) disposed therebetween. The pixels P may be formed or disposed at the intersections of the lower electrodes 623*a* and the upper electrodes 623*b* and the pixels P may emit light according to control signals applied to the lower electrodes 623*a* or the upper electrodes 623*b*.

According to an embodiment, pores 643*a* may be formed and arrayed in various forms between the pixels P depending on the patterns or paths that the lower electrodes 623*a* or the upper electrodes 623*b* form. According to an embodiment, where the sensor layer 641 is disposed under the display panel 602*b*, e.g., the light emitting layer 621, the pores 643*a* may form, and be arrayed in, a coded pattern (e.g., the coded pattern of the openings 343*b* of FIG. 6) in the area corresponding to the sensor layer 641. For example, the pattern or path that the lower electrodes 623*a* or the upper electrodes 623*b* form may be designed given the array of the pores 643*a*. Thus, the sensor layer 641 may easily be stacked on the display device 602 or the display panel 602*b*, and a portion of the display device 602 or the display panel 602*b* may be utilized as a portion (e.g., the filter layer 343 or lighting device 345 of FIG. 4) of the fingerprint recognition sensor. Although the configuration of the 'fingerprint recognition sensor' is described here as an example, the sensor layer may have the functionality of detecting, e.g., iris images, vein images, or the user's action.

In the above-described embodiments, although the configuration in which the optical sensor, e.g., the fingerprint recognition sensor, is included in the AMOLED display panel is described as an example, embodiments of the disclosure are not limited thereto. For example, the display panel 602*b* may be implemented as an LCD or micro LED-based display, and as long as the display, albeit being implemented as a different type of display, has pores (e.g., the pores 643*a*), the pores may be provided as openings (e.g., the openings 343*b* of FIG. 6) of the filter layer on the sensor layer 641.

According to an embodiment, the display panel 602*b* may be any one of a display for mobile communication terminals, a control panel for office multi-functional copiers, and a display, or control panel, for refrigerators, ovens, or robot cleaners. According to an embodiment, the above-described sensor layer is not necessarily disposed on the display panel, and the sensor layer, along with the coded openings, may form an optical sensor. Such optical sensor may be equipped in an office security device (e.g., a personal computer or office multi-functional copier), a home or office door, or a building entrance/exit control device.

As set forth above, the optical sensor or fingerprint recognition sensor or the electronic device including the same, according to various embodiments, may have a filter layer thinner and with an increased aperture ratio, permitting the superposition of light beams incident onto the sensor layer. The optical sensor with such a structure may present an increased light receiving efficiency although the image detected by the sensor layer may differ from that of the object identified with the naked eye. Further, the optical sensor enables an easier restoring of the object image (or information required for identifying the user) using the restored pattern corresponding to the coded pattern. For example, the optical sensor or the electronic device including the same, according to various embodiments, may be made more compact or slimmer while enabling easier detection of information necessary for user authentication or images for identifying the object. According to an embodiment, the filter layer of the optical sensor may be implemented with the light emitting layer of the OLED display panel, and the lighting device for irradiating the object may also be implemented with the light emitting device or the window member of the display device. For example, according to an embodiment, the optical sensor may be formed as part of the display panel, reinforcing the security of the electronic device while having no or less influence on designing the architecture of the electronic device.

Figure 15:
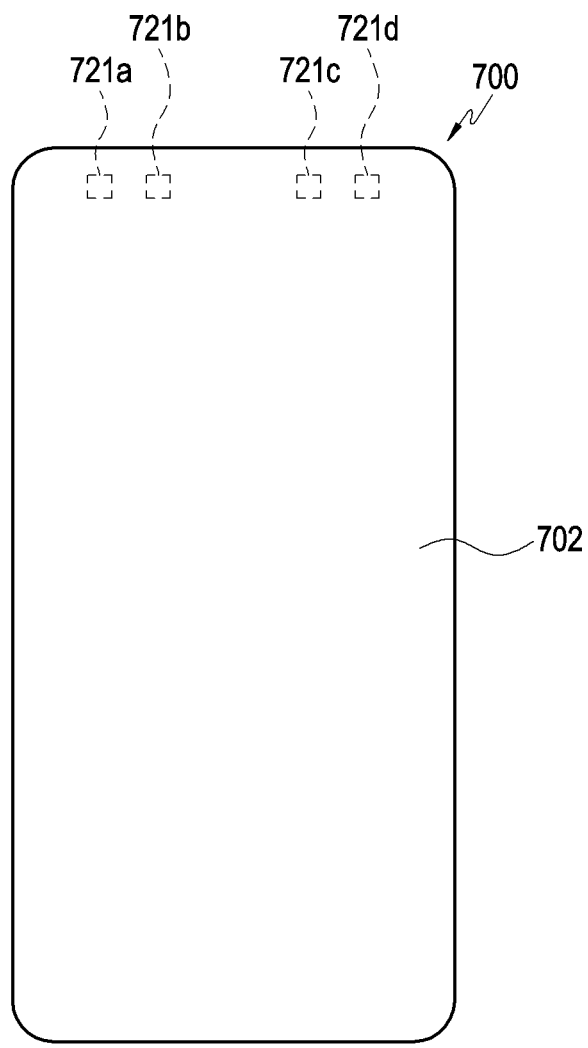
FIG. 15 is a front view illustrating an electronic device according to an embodiment of the disclosure.

FIG. 15 is a front view illustrating an electronic device according to an embodiment of the disclosure.

Referring to FIG. 15, an electronic device 700 may include a plurality of optical sensors 721*a*, 721*b*, 721*c*, and 721*d* (e.g., at least a portion of the sensor module 176 of FIG. 1). According to an embodiment, the plurality of sensors 721*a*, 721*b*, 721*c*, and 721*d* may at least partially overlap the screen area of a display 702 and may receive various pieces of information from light incident through pores (e.g., the pores 643*a* of FIG. 14) formed in the display 702. According to an embodiment, the plurality of sensors 721*a*, 721*b*, 721*c*, and 721*d* may substantially be hidden by the display 702. Alternatively, the plurality of sensors 721*a*, 721*b*, 721*c*, and 721*d* may include a gesture sensor, a proximity sensor, a color sensor, an infrared (IR) sensor, a biometric sensor (e.g., an iris recognition sensor) or an illuminance sensor.

Figure 16:
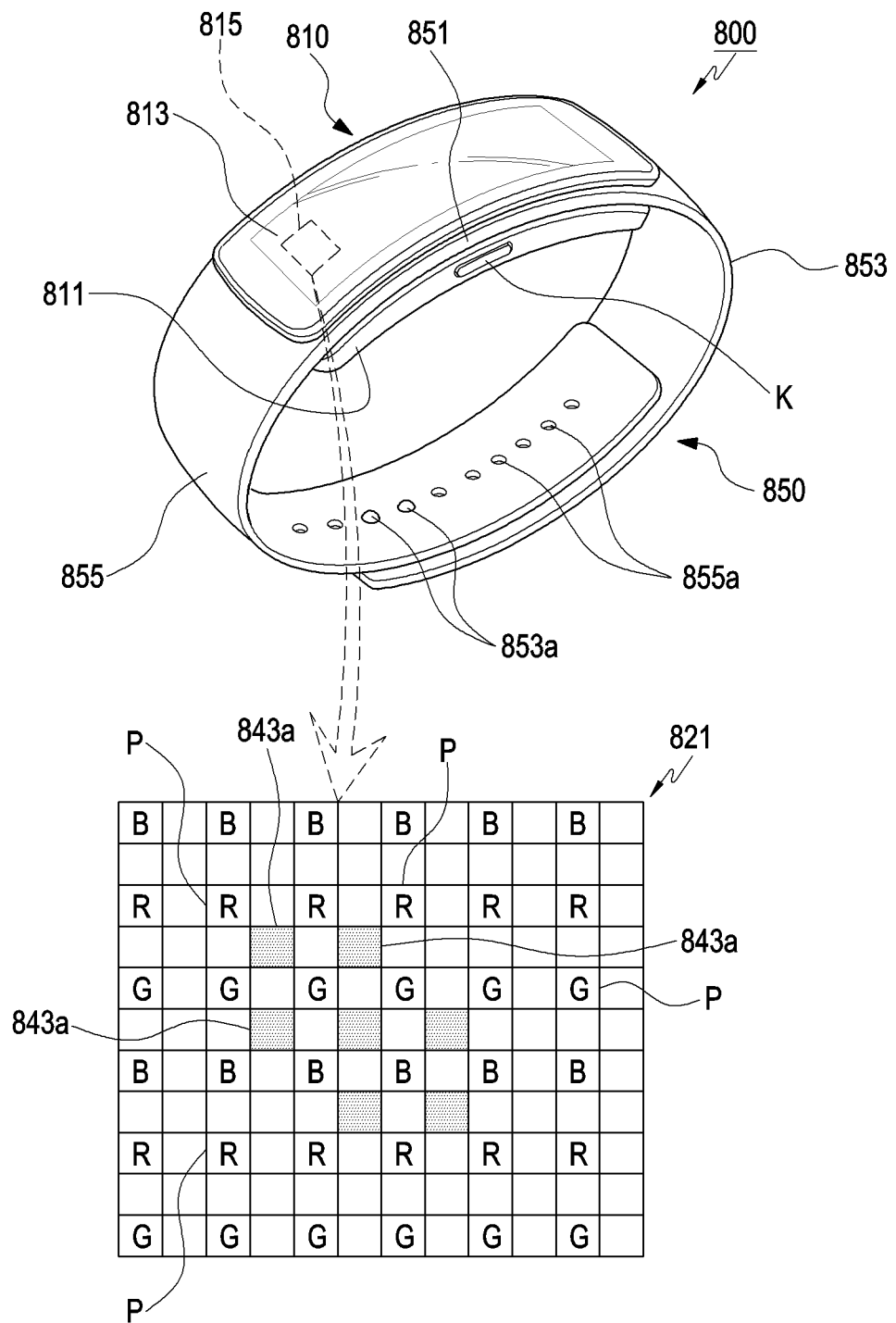
FIG. 16 is a perspective view illustrating an electronic device according to an embodiment of the disclosure.

FIG. 16 is a perspective view illustrating an electronic device according to an embodiment of the disclosure.

Referring to FIG. 16, an electronic device 800 may include, e.g., a wearable electronic device, which may be put on the user's wrist as is a wrist watch or bracelet.

According to an embodiment, the electronic device 800 may include a main body 810, as a functional device, and a wearing member 850, e.g., bands or straps, for putting the electronic device 800 on the user's body portion. The main body 810 may detachably be coupled with the wearing member 850. For example, the main body 810 may be coupled to the wearing member 850 while being at least partially received therein. While the main body 810 couples with the wearing member 850, at least a portion of the main body 810 may face a portion of the wearing member 850. On the main body 810 may be arranged a display device 813 to display various types of information, a pressing key (e.g., a side key K) to enter various types of information, a sensor unit (e.g., a biometric signal sensor or proximity/illuminance sensor), or a touch input unit.

The main body 810 may be shaped as a bar and may at least partially have a curvature corresponding to the user's body. For example, the main body 810 may be shaped as a rectangle elongated substantially along the vertical direction while being curved.

The wearing member 850 allows the main body 810 to stably rest on the user's body portion, and as necessary, may bring the main body 810 in tight contact with the user's skin. The wearing member 850 may be implemented as elastic bands or straps or a non-elastic chain. Alternatively, a portion (e.g., seating portion 851) of the wearing member 850, which is coupled with the main body 810, may be configured to be elastically transformable, and a surface (e.g., the inner surfaces of the first and second wearing members 853 and 855) of the wearing member, which comes in contact with the user's body portion, may be formed of a non-elastic material.

Given that the electronic device 800 is worn on the user's body portion, the first wearing member 853 and the second wearing member 855 may be joined together, making the electronic device 800 shaped substantially as a closed loop. For example, the user may wear the electronic device 800 *b* by joining together the first and second wearing members 853 and 855 to wrap around his body portion (e.g., wrist).

The wearing member 850 may include a means to join the first and second wearing members 853 and 855 together. For example, the first wearing member 853 may have at least one fastening protrusion 853*a*, and the second wearing member 855 may have multiple fastening holes 855*a*. The fastening holes 855*a* may be arrayed along the extending direction of the second wearing member 855 and may be engaged with the fastening protrusion 853*a*. The fastening protrusion 853*a* may be engaged with one of the fastening holes 855*a* to fasten together the first and second wearing members 853 and 855, allowing the wearing member 850 to maintain its loop shape.

The above-described fastening structure is merely an example and may be replaced with other various structures (e.g., a buckle or hook-type fastening structure) depending on the material and structure of the first and second wearing members 853 and 855.

The display device 813 may be mounted on the front surface of the main body 810, e.g., the main body housing 811. Although the display device 813 is shaped to reflect the user's body curve as an example, the display device 813 may be configured of a flat, LCD or OLED, display, a curved display, or a flexible display, and the display device 813 may be integrated with a touch panel to implement a touchscreen.

According to an embodiment, the electronic device 800 may include an optical sensor 815, e.g., a proximity sensor, a color sensor, an IR sensor, a biometric sensor (e.g., an iris recognition sensor), an illuminance sensor, or the fingerprint recognition sensor 204 of FIG. 2. According to an embodiment, the display device 813 may be a micro light emitting diode (µLED)-based display. According to an embodiment, the display device may include a light emitting layer 821 including an array of light emitting pixels P. A plurality of pores 843*a* may be formed between the light emitting pixels P. At least some of the pores 843*a* may be together arrayed to form a coded pattern. Thus, the sensor 815 may detect various pieces of information regarding the operational environment of, e.g., the electronic device 800 based on light received from the outside through the coded pattern. According to an embodiment, the sensor 815 may include an image sensor that may detect an object image from light received through at least some of the pores 843*a*.

According to an embodiment, there may be provided an electronic device including an optical sensor, the optical sensor comprising a lighting device configured to emit light, a sensor layer including an array of sensors configured to detect first image information corresponding to an object from light reflected by the object, and a filter layer including openings configured to transmit the light reflected by the object, the filter layer disposed on the sensor layer, wherein the first image information is different from an image of the object identified with naked eyes.

According to an embodiment, there may be provided an electronic device 200 including an fingerprint recognition sensor 204 or 304, the fingerprint recognition sensor 204 or 304 comprising a lighting device 345 configured to emit light, a sensor layer 341, 541, or 641 including an array of sensors configured to detect first image information corresponding to an object from light reflected by the object, and a filter layer 343, 543, or 643 including openings configured to transmit the light reflected by the object, the filter layer disposed on the sensor layer 341, 541, or 641, wherein the openings may be arrayed to form a coded pattern 443*a*, 443*b*, 443*c*, or C.

According to an embodiment, each of the openings may be shaped as a two-dimensional (2D) or three-dimensional (3D) rectangle.

According to an embodiment, the openings may be arrayed in a matrix of 40009*40009 or a smaller matrix.

According to an embodiment, the filter layer 343, 543, or 543 may include a coat layer configured to transmit or reflect light of a predetermined wavelength.

According to an embodiment, the filter layer 343, 543, or 643 may include an anti-reflection coat layer and an index matching layer.

According to an embodiment, the lighting device 345 may include a light emitting device and a waveguide device configured to propagate light emitted from the light emitting device. One surface of the waveguide device may be disposed to face or contact the object.

According to an embodiment, the light emitting device may be configured to emit the light from at least one side edge of the waveguide device in a direction crossing a direction in which the surface of the waveguide device faces.

According to an embodiment, the electronic device 200 may further comprise a display panel 202*b* or 602*b* including a light emitting layer. The sensor layer may be configured to detect the first image information from the light that is reflected by the object and transmitted through the light emitting layer.

According to an embodiment, the light emitting layer may include pixels P configured to emit, at least, red, green, and blue light and pores or air gaps 643*a* arrayed between at least some of the pixels. At least some of the openings may include the pores 643*a* in an area corresponding to the sensor layer 341, 541, or 641.

According to an embodiment, the lighting device may include pixels P arrayed as a portion of the light emitting layer. The pixels P may be configured to emit, at least, red, green, and blue light to the object.

According to an embodiment, the electronic device 200 may further comprise a window member 602*a* disposed in a front surface of the display panel 202*b* or 602*b*.

According to an embodiment, the display panel 202*b* or 602*b* may include an organic light emitting diode (OLED) or a micro light emitting diode (μLED).

According to an embodiment, the electronic device 101 or 200 may further comprise a processor 120 and a memory 130 storing a restored pattern corresponding to the coded pattern of the openings. The coded pattern and the restored pattern may be configured to meet a delta function.

According to an embodiment, the processor 120 may be configured to produce second image information corresponding to the object by a convolution of the restored pattern and the first image information.

According to an embodiment, the processor 120 may be configured to perform user authentication based on the second image information.

According to an embodiment, the electronic device 200 may further comprise a housing 201 including a first surface facing in a first direction, a second surface facing in a second direction which is opposite to the first direction, and a side wall formed to at least partially surround a space between the first surface and the second surface and a display device 202 mounted on the first surface. The sensor layer 341, 541, or 641 may be disposed inside the display device 202.

According to an embodiment, the display device 202 may include a display panel 202*b* or 602*b* and a window member 202*a* or 602*a* configured to transmit a screen output from the display panel 202*b* or 602*b*. The lighting device 345 may include a light emitting device and a waveguide device configured, as a portion of the window member 202*a* or 602*a*, to transmit or propagate light emitted from the light emitting device.

According to an embodiment, the light emitting device is provided to include at least a portion of a light emitting layer of the display panel 202*b* or 602*b*.

According to an embodiment, the display panel 202*b* or 602*b* may include a light emitting substance, lower electrodes 623*a* arrayed under the light emitting substance, upper electrodes 623*b* arrayed over the light emitting substance, and pixels P formed at intersections of the upper electrodes and the lower electrodes, with the light emitting substance disposed therebetween. The pixels may be configured to emit at least one of red light, green light, or blue light to the object according to a control signal applied to each of the upper electrodes or the lower electrodes.

According to an embodiment, the display panel 202*b* or 602*b* may further include pores 643*a* formed between the pixels P. At least some of the pores may be arrayed to form the coded pattern in an area corresponding to the sensor layer 341, 541, or 641, thereby forming a portion of the filter layer 343, 543, or 643.

As is apparent from the foregoing description, according to various embodiments of the disclosure, the electronic device may produce an image containing sufficient information as required for user authentication while permitting the superposition of object information (e.g., optical information) in detecting, e.g., the object image, operational environment, or the user's biometric information (e.g., the user's fingerprint) through an optical sensor. For example, upon detecting, e.g., the user's fingerprint, the optical sensor, e.g., a fingerprint recognition sensor, may, despite being able to be made compact, secure sufficient information required for user authentication. According to an embodiment, the filter layer to guide or sort light beams incident onto the sensor layer may include a coded pattern with a high aperture ratio. For example, according to an embodiment, the electronic device, by its high aperture ratio, may detect an object image containing more identification information within the same time period or may more quickly detect an object image containing the same level of identification information. According to an embodiment, in the electronic device the coded pattern of the filter layer and the restored pattern stored in the electronic device enable securing sufficient information required for, at least, user authentication, while permitting the superposition of object information-containing light beams. Thus, the fingerprint recognition sensor and/or the electronic device, e.g., the filter layer, may easily be reduced in thickness. For example, according to an embodiment, the electronic device may be made compact and slim and with enhanced security.

While the disclosure has been shown and described with reference to various embodiments thereof, it will be apparent to those skilled in the art that various changes in form and details may be made therein without departing from the spirit and scope of the disclosure as defined by the claims and their equivalents.

What is claimed is:

1. An electronic device including an optical sensor, the optical sensor comprising:
   a lighting device configured to emit light;
   a sensor layer including an array of sensors configured to detect first image information corresponding to an object from light reflected by the object; and
   a filter layer including openings configured to transmit the light reflected by the object, the filter layer disposed on the sensor layer,
   wherein the first image information is filtered by the openings arrayed in a pattern, and
   wherein a sensor of the array of sensors is configured to detect superposition of the first image information about a plurality of areas of the object.

2. The electronic device of claim 1, wherein each of the openings is shaped as a two-dimensional (2D) or three-dimensional (3D) rectangle.

3. The electronic device of claim 1, wherein the openings are arrayed in a matrix of 40009*40009 or a smaller matrix.

4. The electronic device of claim 1, wherein the filter layer includes a coat layer configured to transmit or reflect light of a predetermined wavelength.

5. The electronic device of claim 1, wherein the filter layer includes an anti-reflection coat layer and an index matching layer.

6. The electronic device of claim 1,
   wherein the lighting device includes a light emitting device and a waveguide device configured to propagate light emitted from the light emitting device, and
   wherein one surface of the waveguide device is disposed to face or contact the object.

7. The electronic device of claim 6, wherein the light emitting device is further configured to emit the light from at least one side edge of the waveguide device in a direction crossing a direction in which the surface of the waveguide device faces.

8. The electronic device of claim 1, further comprising a display panel including a light emitting layer,
   wherein the sensor layer is further configured to detect the first image information from the light that is reflected by the object and transmitted through the light emitting layer.

9. The electronic device of claim 8,
wherein the light emitting layer includes pixels configured to emit, at least, red, green, and blue light and pores or air gaps arrayed between at least some of the pixels, and
wherein at least some of the openings include the pores in an area corresponding to the sensor layer.

10. The electronic device of claim 8,
wherein the lighting device includes pixels arrayed as a portion of the light emitting layer, and
wherein the pixels are configured to emit, at least, red, green, and blue light to the object.

11. The electronic device of claim 8, further comprising a window member disposed in a front surface of the display panel.

12. The electronic device of claim 8, wherein the display panel includes an organic light emitting diode (OLED) or a micro light emitting diode (μLED).

13. The electronic device of claim 1, further comprising:
a processor; and
a memory storing a restored pattern corresponding to a coded pattern formed by an arrangement of the openings,
wherein the coded pattern and the restored pattern are configured to meet a delta function.

14. The electronic device of claim 13, wherein the processor is further configured to produce second image information corresponding to the object by a convolution of the restored pattern and the first image information.

15. The electronic device of claim 14, wherein the processor is further configured to perform user authentication based on the second image information.

16. The electronic device of claim 1, further comprising:
a housing including a first surface facing in a first direction, a second surface facing in a second direction which is opposite to the first direction, and a side wall formed to at least partially surround a space between the first surface and the second surface; and
a display device mounted on the first surface,
wherein the sensor layer is disposed inside the display device.

17. The electronic device of claim 16,
wherein the display device includes a display panel and a window member configured to transmit a screen output from the display panel, and
wherein the lighting device includes a light emitting device and a waveguide device configured, as a portion of the window member, to transmit or propagate light emitted from the light emitting device.

18. The electronic device of claim 17, wherein the light emitting device is provided to include at least a portion of a light emitting layer of the display panel.

19. The electronic device of claim 17,
wherein the display panel includes a light emitting substance, lower electrodes arrayed under the light emitting substance, upper electrodes arrayed over the light emitting substance, and pixels formed at intersections of the upper electrodes and the lower electrodes, with the light emitting substance disposed therebetween, and
wherein the pixels are configured to emit at least one of red light, green light, or blue light to the object according to a control signal applied to each of the upper electrodes or the lower electrodes.

20. The electronic device of claim 19,
wherein the display panel further includes pores formed between the pixels, and
wherein at least some of the pores are arrayed to form a coded pattern in an area corresponding to the sensor layer, thereby forming a portion of the filter layer.

21. The electronic device of claim 20,
further comprising a polarizing plate,
wherein the polarizing plate is formed directly above a layer containing the pores and the pixels.

\* \* \* \* \*